United States Patent
Ishikawa et al.

(10) Patent No.: US 6,828,867 B2
(45) Date of Patent: Dec. 7, 2004

(54) SLOT ELECTRODE DIELECTRIC RESONATOR, INDUCTOR, CAPACITOR, DIELECTRIC FILTER, OSCILLATOR, AND COMMUNICATION DEVICE

(75) Inventors: Yohei Ishikawa, Kyoto (JP); Kenichi Iio, Nagaokakyo (JP); Hiroaki Tanaka, Mishima-gun (JP); Yutaka Ida, Otsu (JP)

(73) Assignee: Murata Manufacturing Co., Ltd. (JP)

( * ) Notice: Subject to any disclaimer, the term of this patent is extended or adjusted under 35 U.S.C. 154(b) by 52 days.

(21) Appl. No.: 10/359,234

(22) Filed: Feb. 6, 2003

(65) Prior Publication Data

US 2003/0137370 A1 Jul. 24, 2003

Related U.S. Application Data

(62) Division of application No. 10/122,714, filed on Apr. 12, 2002, now Pat. No. 6,556,107, which is a division of application No. 09/511,448, filed on Feb. 23, 2000, now Pat. No. 6,411,181.

(51) Int. Cl.$^7$ .............................. H01P 7/00; H03B 7/12
(52) U.S. Cl. .............................. 331/107 DP; 333/204; 333/219
(58) Field of Search ................. 333/219, 238, 333/246, 134, 204; 331/107 DP, 107 SL

(56) References Cited

U.S. PATENT DOCUMENTS 3,760,302 A * 9/1973 Cohn ..................... 333/204
5,434,542 A * 7/1995 Veith et al. .................... 331/99
6,411,181 B1 * 6/2002 Ishikawa et al. ............ 333/219
6,486,754 B1 * 11/2002 Hidaka et al. .............. 333/219

FOREIGN PATENT DOCUMENTS

| JP | 62-216407 | 9/1987 |
| JP | 10-335926 | 12/1998 |

OTHER PUBLICATIONS

Yoshiaki Uematsu et al, "Planer Track Resonator Dual Band Filter," Grand Meeting of the Electronic Information and Communications Society for Year 1997, Electronic Information and Communications Society of Japan, (1997), C–2–103, p. 158.

Japanese Office Action issued Mar. 4, 2003 (w/ English translation of relevant portion).

* cited by examiner

*Primary Examiner*—Benny Lee
*Assistant Examiner*—Stephen E. Jones
(74) *Attorney, Agent, or Firm*—Dickstein, Shapiro, Morin & Oshinsky, LLP.

(57) ABSTRACT

A dielectric resonator includes a slot line constructed by providing a slot electrode having a spiral slot at either an external face of a dielectric layer or inside the dielectric layer and a shielding conductor provided at a predetermined distance from the slot electrode. The slot line is employed as a resonant line so as to provide a dielectric resonator, an inductor, a capacitor, a dielectric filter, an oscillator, and/or a communication device.

3 Claims, 13 Drawing Sheets

FIG. 9A
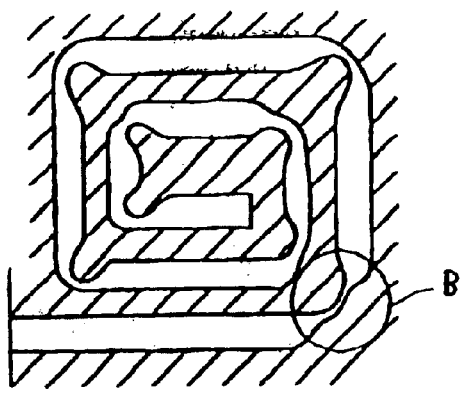
FIG. 9B
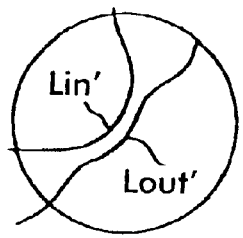
FIG. 9C
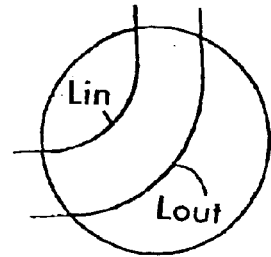
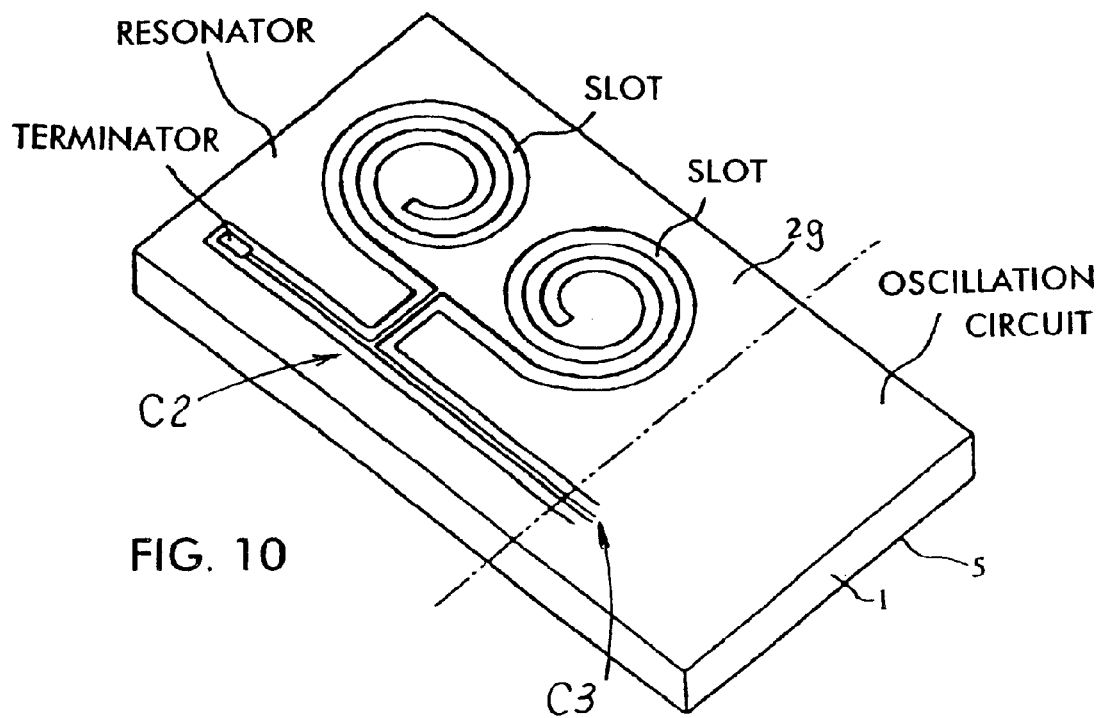
FIG. 10

POSITION OF SLOT IN LONGITUDINAL
DIRECTION L

POSITION OF SLOT IN LONGITUDINAL
DIRECTION L

SHORT-CIRCUIT END
SLOT
OPEN END

OPEN END
SLOT
SHORT-CIRCUIT END

SLOT ELECTRODE DIELECTRIC RESONATOR, INDUCTOR, CAPACITOR, DIELECTRIC FILTER, OSCILLATOR, AND COMMUNICATION DEVICE

CROSS REFERENCE TO RELATED APPLICATION

This is a divisional of U.S. patent application Ser. No. 10/122,714, filed Apr. 12, 2002, now U.S. Pat. No. 6,556,107, which is a divisional of U.S. patent application Ser. No. 09/511,448, filed Feb. 23, 2000 in the name of Yohei ISHIKAW, Kenichi IIO, Hiroaki TANAKA and Yutaka IDA and entitled DIELECTRIC RESONATOR, INDUCTOR, CAPAITOR, DIELECTRIC FILTER, OSCILLATOR, AND COMMUNICATION DEVICE, now U.S. Pat. No. 6,411,181.

BACKGROUND OF THE INVENTION

1. Field of the Invention

The present invention relates to a dielectric resonator, an inductor, a capacitor, a dielectric filter, and an oscillator which are produced by forming a slot line in an electrode on a dielectric substrate, and a communication device using the above.

2. Description of the Related Art

Microstrip line resonators and slot line resonators are known types of resonators employing dielectric substrates for use in a microwave band or a millimeter wave band.

A conventional slot line resonator is a single resonator constructed using a linear slot line having a length of half a wavelength. Since the slot line resonator has continuous electrodes surrounding slots, electromagnetic energy is highly efficiently enclosed in the vicinity of the slot line resonator. Therefore, when the slot line resonator is implemented in a high-frequency circuit, less interference with other circuits occurs.

FIGS. 19A and 19B will be used to describe the conductor loss in a resonator using a conventional slot line. FIG. 19A is a cross-sectional view of the slot line. FIG. 19B is an enlarged view of the portion designated "B" in FIG. 19A. A slot line resonator has a certain amount of conductor loss.

The electrode, which constitutes the slots, is divided into three regions, i.e., an edge region, a top face region, and a bottom face region. Computation of the conductor loss is performed on each region using a simulator. The following Table 1 shows the ratio of the conductor loss in the top and bottom face regions of the electrode to the total conductor loss in a slot line in which the sizes shown in FIG. 19A are employed.

TABLE 1

| SLOT WIDTH | RATIO OF LOSS IN TOP AND BOTTOM FACE REGIONS OF ELECTRODE TO TOTAL CONDUCTOR LOSS |
|---|---|
| 10 μm | 77% |
| 25 μm | 84% |
| 50 μm | 88% |
| 100 μm | 90% |

Regardless of the slot width, the loss in the top and bottom face regions of the electrode is the major portion of the total conductor loss. When, for example, the slot width is 100 μm, approximately ninety percent of the total loss occurs at the top and bottom faces of the electrode.

Although dielectric loss occurs in the slot line resonator, the conductor loss is the dominant factor.

As described above, the conductor loss at the top and bottom faces of the electrode, caused by the so-called "skin effect", provides the major portion of the total conductor loss The skin effect occurs because of a nonuniform distribution of current inside the electrode; in other words, because of greater current density at the surface of the electrode.

SUMMARY OF THE INVENTION

In response to these issues, the present invention is able to provide a dielectric filter, an inductor, a capacitor, and an oscillator in which conductor loss due to the skin effect is effectively reduced and a dielectric resonator having a high unloaded Q-factor ($Q_0$), as well as a communication device using the above.

To this end, according to a first aspect of the present invention, there is provided a dielectric resonator including a slot line constructed by providing a slot electrode having a spiral slot on an external face of a dielectric layer or inside of the dielectric layer and a shield conductor provided at a predetermined distance from the slot electrode. The slot line is employed as a resonant line.

Hereinafter, an end of the spiral at the outermost circumference thereof is denoted an exterior end while an end of the spiral at the innermost circumference thereof is denoted an interior end. FIG. 17 shows the electromagnetic field distribution in a linear slot line and directions of the currents induced by the magnetic field. Broken curved lines represent the direction of the magnetic field, solid curved lines represent that of the electric field, and linear arrows represent that of currents in the slot electrode induced by electromagnetic waves propagating in the slot. A remarkable point is that the directions of currents flowing through the electrode on the respective sides of the slot are mutually opposite. The present invention constructively takes advantage of this effect. That is, by forming the slot line into a spiral shape, currents flowing through the electrode between neighboring turns of the spiral slot are counterbalanced whereby conductor loss is reduced.

In a typical slot line, one end thereof is a short-circuit end and the other end thereof is an open end. In this case, it is preferable that the line length be $\lambda_g/2$ or $\lambda_g/4$ when the resonant wavelength of the resonator is denoted as $\lambda_g$. Since the direction of the magnetic field is unchanged in a section between nodes of a standing wave in the resonator, the direction of the current induced in the slot electrode is also unchanged in that section. When the directions of the currents through the electrode on both sides of the entire slot are unchanged, by forming spiraled slots, the current counterbalance always occurs between neighboring turns. When a node of the standing wave exists in the resonator, by forming spiraled slots, there is a part in which the current density is increased. Therefore, it is preferable that the resonator (the slot) length be $\lambda_g/2$ or $\lambda_g/4$.

The width of the slot line may be wider in the proximity of the short-circuit end thereof than in the proximity of the open end thereof. The current density of the electrode on both sides is maximum at the short-circuit end thereof and zero at the open end thereof. By forming spiraled slots, since the turns of the slots where the current density is different are disposed closely, though the counterbalance occurs, the current counterbalance effect does not cause the current value to be zero. Accordingly, it is preferable that the slot width be gradually changed so that the current counterbalance occurs over the entire slot, whereby, as a result, the current value approaches zero.

In the dielectric resonator, the width of the slot line may be changed through substantially the entire length thereof. Furthermore, the width of the slot line may be changed by forming curves at certain positions along the longitudinal direction thereof.

In the dielectric resonator, one end of the slot line may be a short-circuit end and the other end thereof may be an open end, thereby employing the slot line as a quarter-wavelength resonant line. Because of this, the entire line length becomes shorter and the area occupied by the slot line is also further reduced.

In the dielectric resonator, when an exterior circumferential end of the slot line is a spiral short-circuit end, the slot line may be employed either as a quarter-wavelength resonant line or a half-wavelength resonant line. That is, the quarter-wavelength resonant line is obtained in a case where the interior end is an open end, while the half-wavelength resonator line is obtained in a case where the interior end is a short-circuit end. Both cases place the maximum value of the magnetic field intensity at the exterior end of the spiral slot line.

In the dielectric resonator, the slot electrode may have two spiral slots whose exterior circumferences are connected to each other having substantially a point-symmetry relationship therebetween and the interior circumferential ends of the two slots are individually employed as short-circuit ends of the slot lines.

Since this construction places at the symmetry point a maximum electric field value and places maximum magnetic field values at each of the interior ends of the two spiral slot lines individually, the electromagnetic field is highly efficiently enclosed.

In the dielectric resonator, the slot electrode may have two spiral slots whose exterior circumferences are connected to each other so as to have a line-symmetry relationship therebetween and the interior circumferential ends of the two slots are individually employed as short-circuit ends of the slot line. This construction places a maximum electric field value at the position on the symmetry line, and makes the distance between neighboring slot lines wider.

In the dielectric resonator, the slot may have a spiral shape obtained by deforming the entire body thereof substantially into a rectangle, which can reduce the area occupied by the spiral slot on the dielectric substrate.

According to a second aspect of the present invention, there is provided an inductor including a slot line constructed by providing a slot electrode having a spiral slot at one of an external face of a dielectric layer and inside of the dielectric layer, and a shielding conductor provided at a predetermined distance from the slot electrode. In the inductor, an end of the slot line is a short-circuit end and the length of the slot is not more than one-eighth of a transmission wavelength of the slot line.

In the inductor, the width of the slot line may be wider in the proximity of a short-circuit end thereof than in the proximity of an open end thereof, which makes the current density distribution in the longitudinal direction of the slot line uniform, whereby the total conductor loss is reduced.

According to a third aspect of the present invention, there is provided a capacitor including a slot line constructed by providing a slot electrode having a spiral slot at one of an external face of a dielectric layer and inside of the dielectric layer, and a shielding conductor provided at a predetermined distance from the slot electrode. In the capacitor, an end of the slot line is an open end and the length of the slot is not more than one-eighth of a transmission wavelength of the slot line.

In the capacitor, the width of the slot line may be wider in the proximity of a short-circuit end thereof than in the proximity of an open end thereof, which makes the current density distribution in the longitudinal direction of the slot line uniform, whereby the total conductor loss is reduced.

According to a fourth aspect of the present invention, there is provided a dielectric filter including a signal input/output unit and any one of the above dielectric resonators.

According to a fifth aspect of the present invention, there is provided an oscillator including a negative resistance circuit and any one of the above dielectric resonators. In the oscillator, the negative resistance circuit and the dielectric resonator are coupled.

According to a fifth aspect of the present invention, there is provided a communication device including at least one of the above described inductor, the above described capacitor, the above described dielectric filter, and the above described oscillator.

Other features and advantages of the invention will be understood from the following description of embodiments thereof, with reference to the drawings, in which like references denote like elements and parts.

BRIEF DESCRIPTION OF THE DRAWINGS

FIGS. 9A, 9B, and 9C are diagrams showing another pattern of a rectangular spiral slot;

FIG. 10 is a diagram showing the construction of an oscillator;

DESCRIPTION OF EMBODIMENTS OF THE INVENTION

Figure 1A:
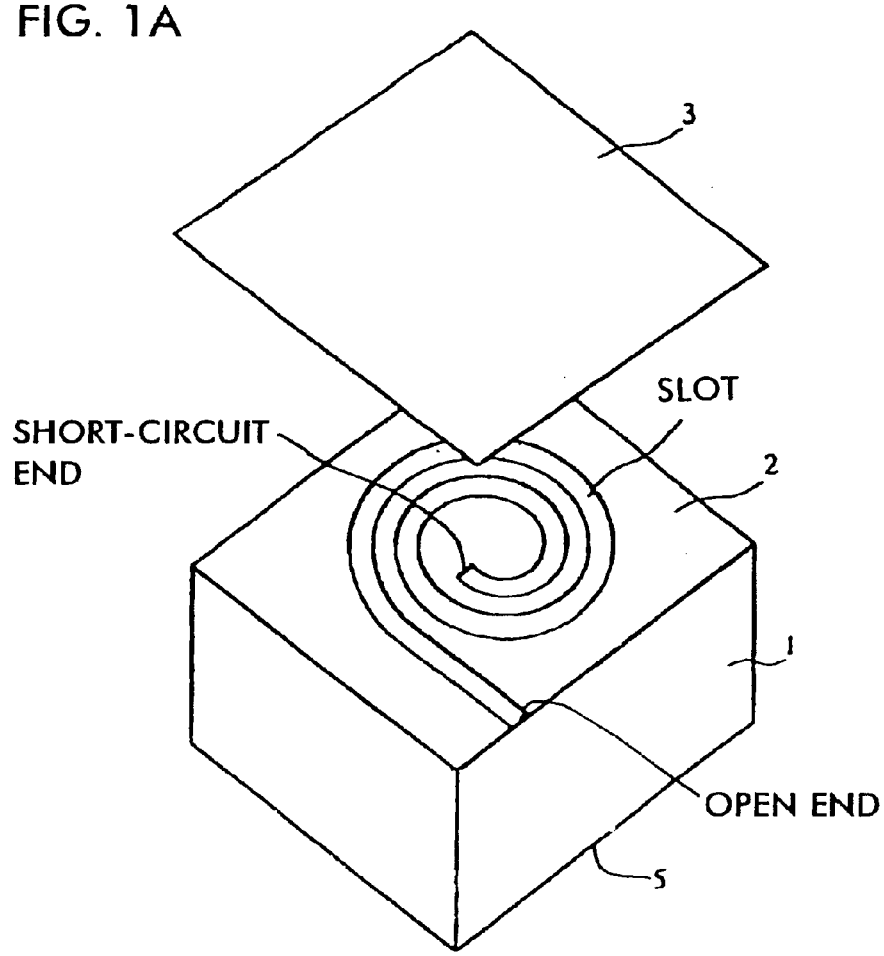
FIGS. 1A and 1B are diagrams showing the construction of a dielectric resonator according to a first embodiment of the present invention.
Figure 1B:
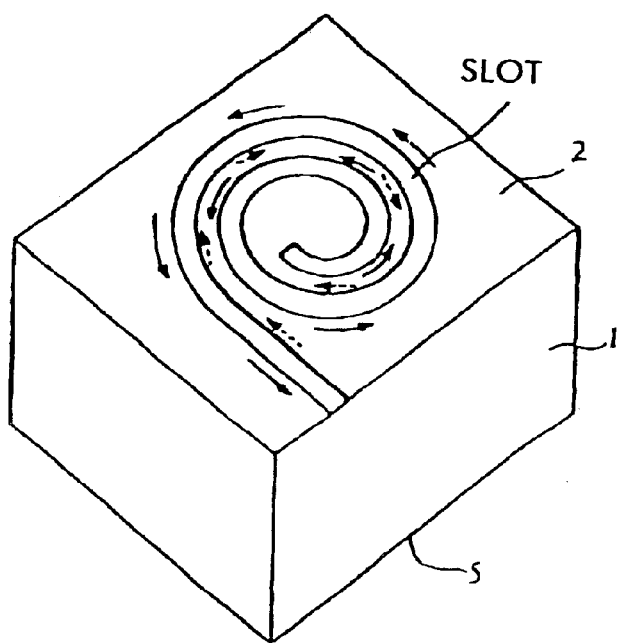

The construction of a dielectric resonator according to a first embodiment of the present invention is described with reference to FIGS. 1A and 1B. FIG. 1A is a perspective view showing primary parts of the dielectric resonator, and FIG. 1B is a perspective view showing a distribution of currents flowing in the proximity of slots. The slots are regions between parts of an electrode in which the dielectric body is exposed. In FIGS. 1A and 1B, a dielectric substrate 1 has a slot electrode 2 having a spiral slot line at the top face of the substrate, and has a shielding electrode 5 formed on substantially the entire bottom face of the substrate. An upper shielding electrode 3 is provided at a predetermined distance above the dielectric substrate 1. The slot line, the upper shielding electrode 3, the shielding electrode 5, an air layer between the slot line and the upper shielding electrode 3, and the dielectric substrate between the slot line and the shielding electrode 5 constitute a resonator. In the peripheral region surrounding the slot line, an electromagnetic field is distributed in the dielectric layer as well as in the outer air layer.

As shown in FIGS. 1A and 1B, the interior end of the slot is a short-circuit end while the exterior end thereof is an open end. When the resonant wavelength of the resonator is denoted as $\lambda_g$, it is preferable that the length of the slot be $\lambda_g/4$ or $\lambda_g/2$. The reason for this is described above.

When the wavelength of an electromagnetic wave distributed in the air layer is denoted as $\lambda_0$, it is preferable that the upper shielding electrode 3 be located within a distance of $\lambda_0/2$ from the slot electrode 2 to provide a good shielding effect. Such a disposition of the upper shielding electrode 3 blocks the radiation of waves toward the outside and the incidence of waves from the outside, thereby acting as a dielectric resonator.

In FIG. 1B, solid arrows represent the direction of a current induced at an exterior circumference of the spiral, and broken arrows represent the direction of a current induced at an interior circumference thereof. Because the currents, which have opposite directions, flow so closely between neighboring turns, currents flowing between neighboring turns are counterbalanced over the entire slot line. Therefore, the conductor loss is greatly reduced between neighboring parts of the slot line.

Figure 18:
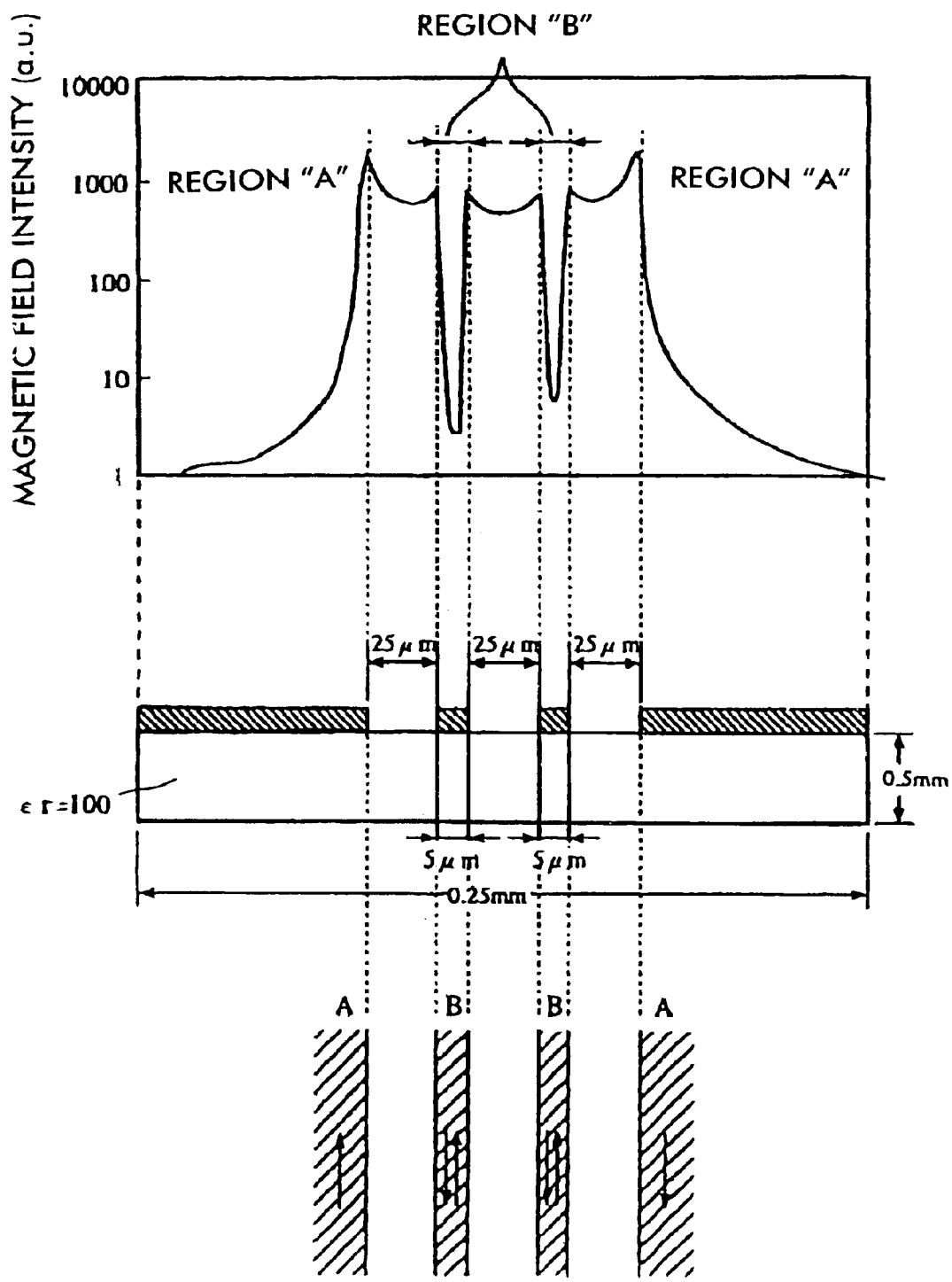
FIG. 18 is a diagram showing a magnetic field intensity distribution in the proximity of the slot line of the first embodiment of the invention.
Figure 19A:
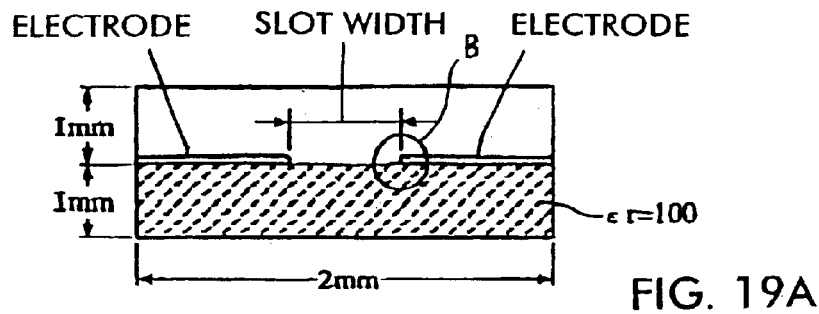
FIGS. 19A and 19B are diagrams showing construction parameters which are used for computation of conductor loss in a conventional slot line.
Figure 19B:
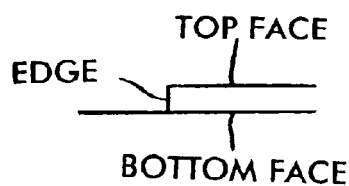

In order to prove the above counterbalance effect, the intensity of a magnetic field which is caused by three parallel turns of the slot line in close proximity to one another, as shown in FIG. 18, is computed using a finite element method (FEM). In FIG. 18, the upper part of the diagram is a graph showing the distribution of the magnetic field intensity; the middle part of the diagram is a cross sectional view showing the three parallel turns; and the lower part of the diagram is a plan view of the three parallel turns. In this case, it is assumed that electromagnetic waves having the same phase are excited in each of the three turns. The values of construction parameters as shown in FIG. 18 are used.

As shown in the upper part of the diagram, currents flow extremely densely at edges of the electrodes while the current density decreases drastically further from the edges. The magnetic field intensity in a region "B" is noticeably less than that in a region "A". The region "A" is a region which does not have a slot further outside. Accordingly, it can be understood that the current density between neighboring turns becomes very low, whereby the conductor loss is greatly decreased.

To confirm the above-effect, the inventors produced a resonator having a structure shown in FIGS. 1A and 1B. The open-end of the resonator was connected with an open-end of an another resonator to form a single resonator. The width of the slot was 20 μm and the resonant frequency of the respective resonator was 70 GHz. The unloaded Q of the resonator was 100.

Also, a comparative resonator was produced. The comparative resonator utilized a slot line whose width was 20 μm and length was the same as the combined slot lines of the above-resonator, but the slot was straight. The unloaded Q of the comparative resonator was 40.

Figure 2:
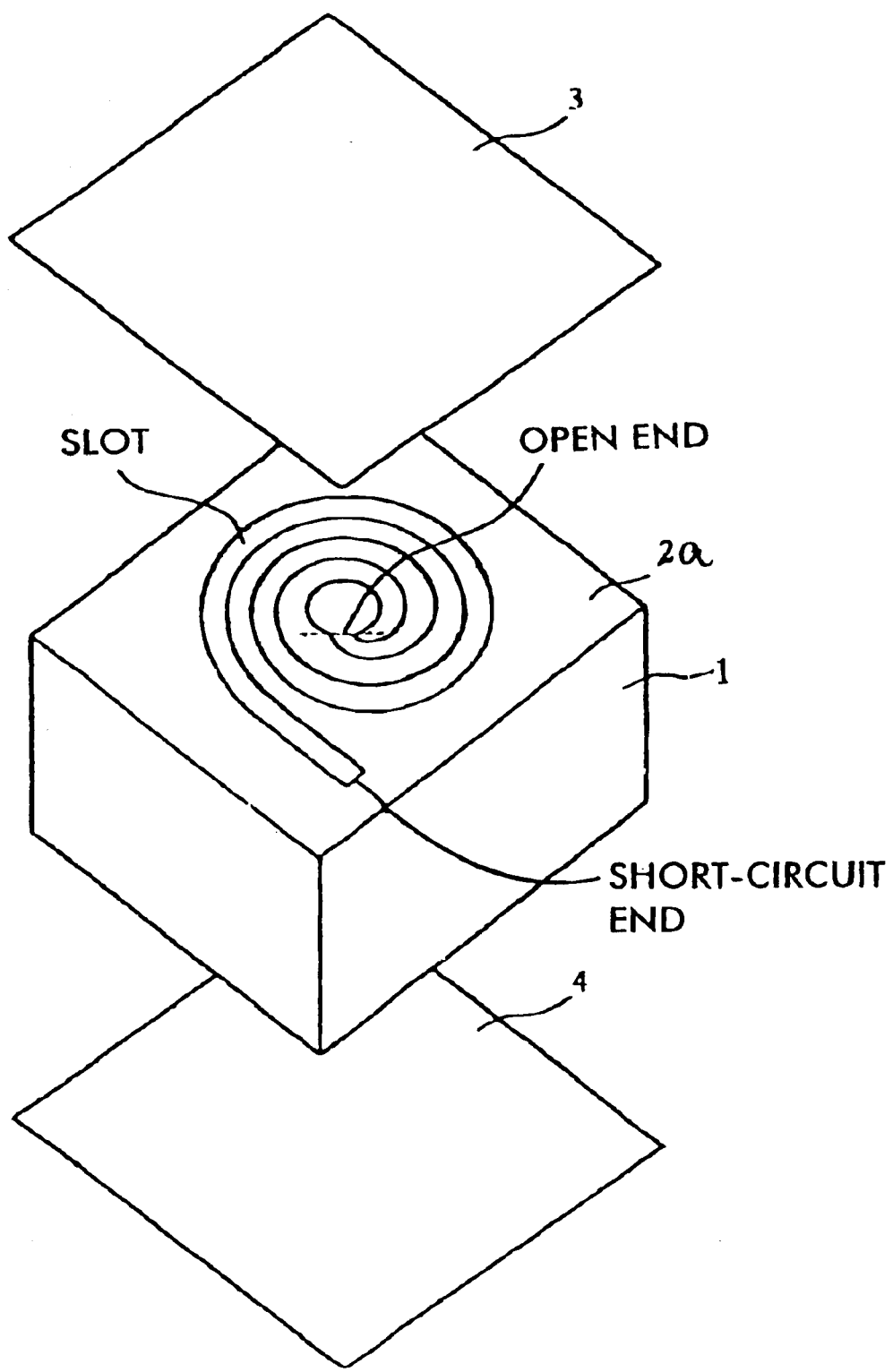
FIG. 2 is a diagram showing the construction of a dielectric resonator according to a second embodiment of the present invention.

The construction of a dielectric resonator according to a second embodiment of the present invention is described with reference to FIG. 2. FIG. 2 is a perspective view showing primary parts of the dielectric resonator. A dielectric substrate 1 has a slot electrode 2a having a spiral slot formed at the top face thereof. As shown in FIG. 2, the slot has an open end at the interior end thereof. The interior end is circular and has no electrode. The slot has a short-circuit end at the exterior end thereof. When the wavelength in the slot line is denoted as $\lambda_g$, the slot length is $\lambda_g/4$, thereby constituting a quarter-wavelength resonator.

Upper and lower shielding electrodes 3 and 4 are provided above and below the dielectric substrate 1, respectively, within a half-wavelength from the slot electrode 2a. The provision of the upper and lower shielding electrodes 3 and 4 blocks the radiation of waves toward the outside and the incidence of waves from the outside, thereby acting as a dielectric resonator.

By making the exterior end of the spiral slot a short-circuit end, since a maximum magnetic intensity point exists outside of the spiral, it is easy to couple the slot with an external circuit. For example, by providing a coaxial probe in the proximity of this short-circuit end, magnetic field coupling between the coaxial probe and the slot line occurs.

The lower shielding electrode 4 is not necessary when the dielectric substrate 1 in FIG. 2 has a shielding electrode formed on substantially the entire bottom face thereof in the same manner as in FIGS. 1A and 1B.

Figure 3:
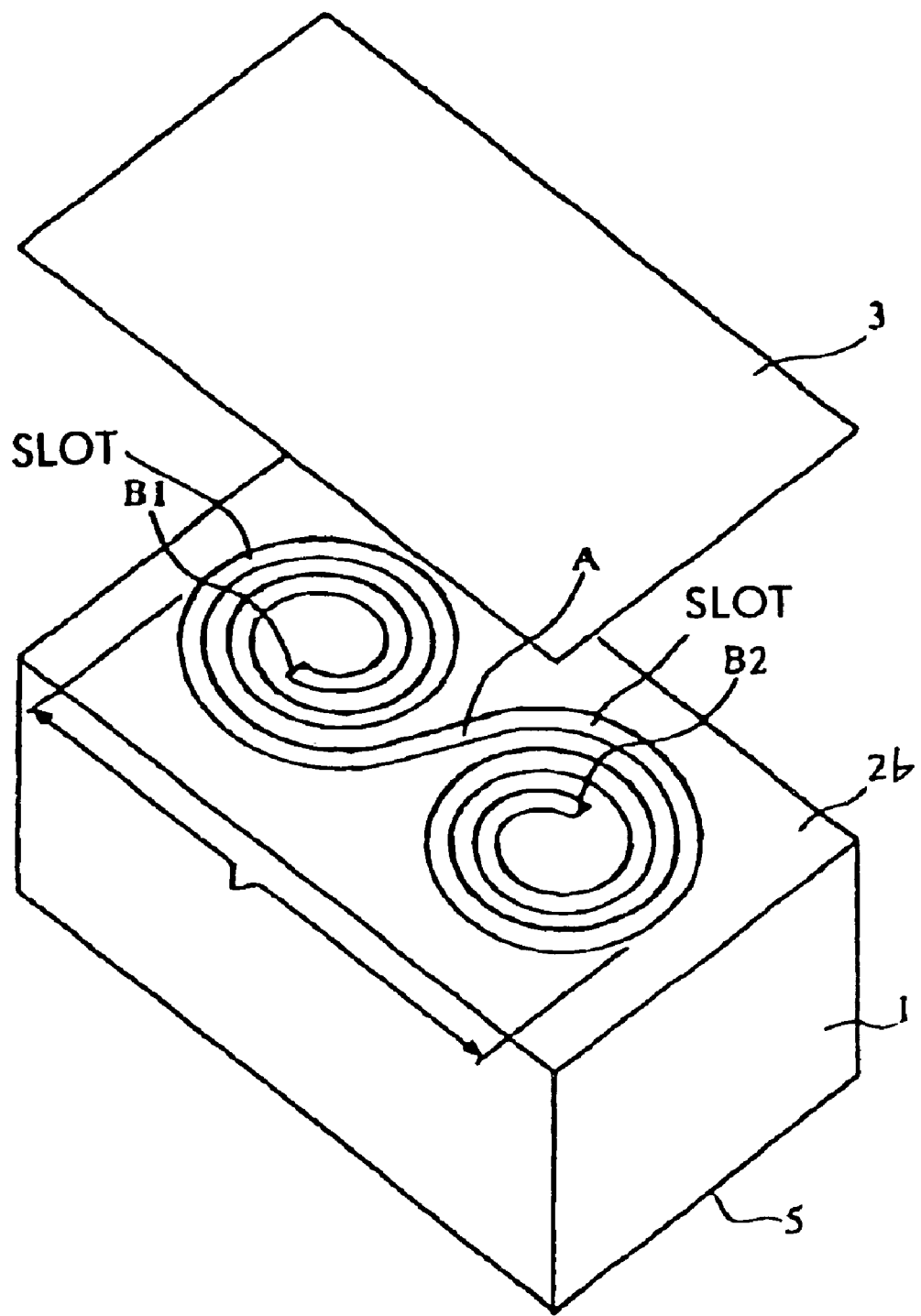
FIG. 3 is a diagram showing the construction of a dielectric resonator according to a third embodiment of the present invention.

The construction of a dielectric resonator according to a third embodiment of the present invention is described with reference to FIG. 3. In FIG. 3, a dielectric substrate 1 has a slot electrode 2b at the top face thereof. An upper shielding electrode 3 is provided at a predetermined distance above the dielectric substrate 1.

The slot electrode 2b with a double spiral slot, the dielectric layer of the dielectric substrate 1, and the outer air layer constitute a slot line. The slot of the spiral electrode 2b has a configuration in which two slots whose rotating directions (starting from the interior end) are identical, are connected, while having a point-symmetrical relationship. This slot line has short-circuit ends at two interior ends B1 and B2 of the spiral slots. The length of the slot line is $\lambda_g/2$ so that the symmetry axis A is equivalent to an open end, whereby a half-wavelength resonator is constituted.

By thus providing two spirals, in proximity to each other, whose rotating directions are identical, the direction of the current induced at the slot in the proximity of the region indicated by "A", and the direction of the current induced at neighboring slots on both sides of the region "A" are counterbalanced. Therefore, the conductor loss due to the skin effect at a part having these three regions in proximity to each other can be reduced. Accordingly, compared with the spiral slot line having a single spiral shape, the space occupied by the double slot on the dielectric substrate can be reduced, which enables the entire device to be further miniaturized.

By further increasing the dielectric constant of the dielectric substrate, it is possible to further decrease the length represented by "L" in FIG. 3, whereby more electromagnetic energy is enclosed in the dielectric substrate, so that the radiation of electromagnetic energy toward the outside is reduced.

The construction of a dielectric filter according to a fourth embodiment of the present invention is described with reference to FIG. 4.

A dielectric substrate 1 has a slot electrode 2c at the top face (as observed in FIG. 4) thereof and has a slot electrode 7, whose pattern is the same as that of the slot electrode 2c (mirror-symmetry), at the bottom face thereof. By providing the slot electrodes 2c and 7 at both faces of the dielectric substrate, a slot line having a double slot structure is constructed. The slot electrode 2c has a structure in which two spirals, whose rotating directions are opposite, are connected so as to have a line-symmetry relationship between these two spirals. This slot line has short-circuit ends at interior ends B1 and B2 of the two spirals and the line length is $\lambda_g/2$ so that a symmetry axis A' is an equivalent open-end, thereby constituting a half-wavelength resonator. On the other hand, in this embodiment of the invention, the two spirals provided by the slot electrode 7 on the bottom face of the substrate 1 (not shown) need not be connected to each other.

The dielectric substrate 1 has a coplanar line formed by the pattern of the slot electrode 2c on the top face, and the central conductor of the coplanar line is disposed so as to be perpendicular to the slots at the region A'. A ground electrode (not shown) is formed on the bottom face of the substrate 1, opposite the coplanar line. This construction enables electric-field coupling between the coplanar line and the slot line to occur, so that the resonator and the coplanar line constitute a dielectric filter having the coplanar line as a signal input/output circuit. This filter functions in the same manner as a band elimination filter (BEF) provided with a one-stage trap resonator between a transmission line and a ground.

Figure 4:
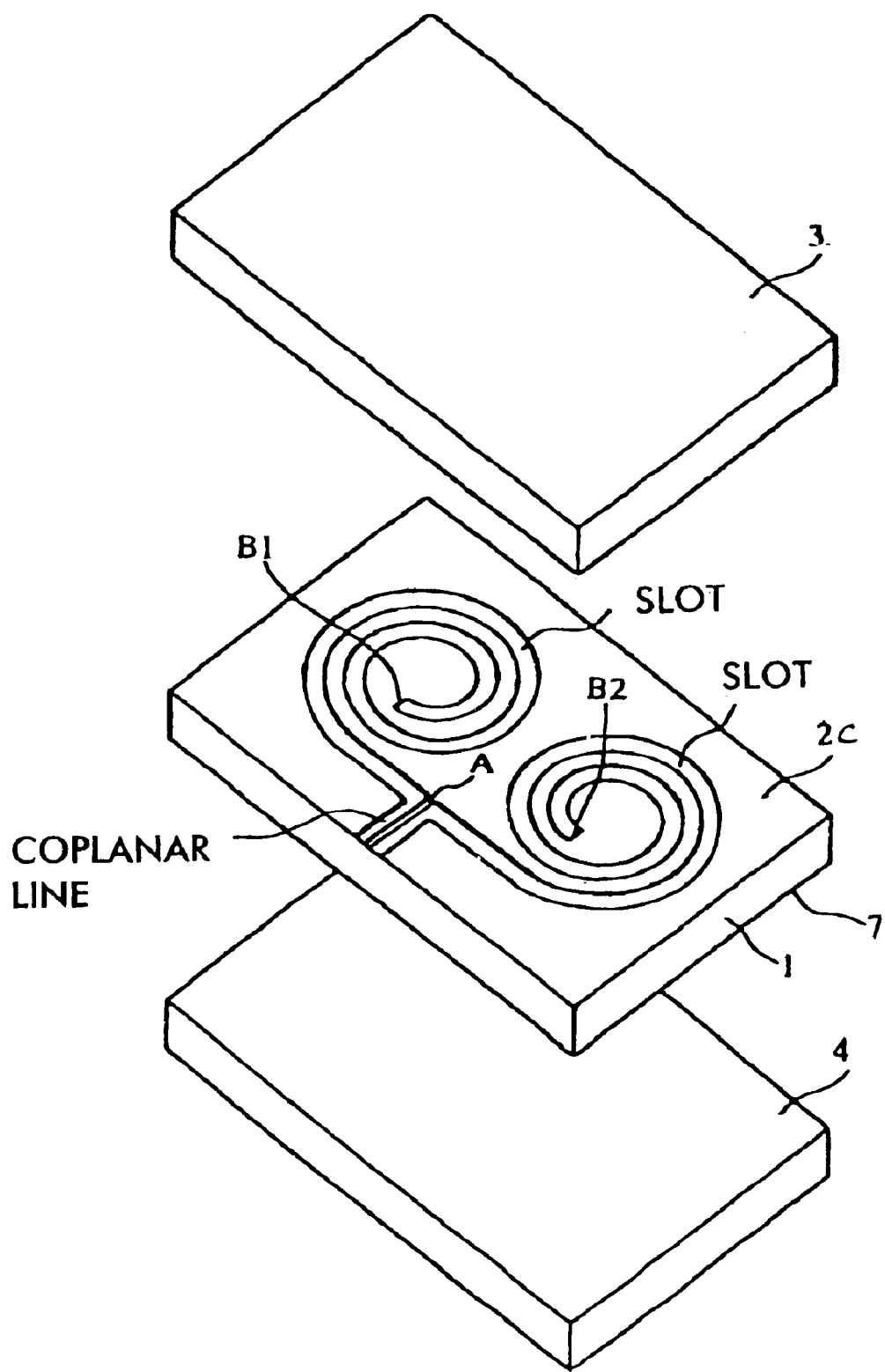
FIG. 4 is a diagram showing the construction of a dielectric filter according to a fourth embodiment of the present invention.

As shown in FIG. 4, when two slots are disposed so as to have a line-symmetry relationship, since a region in which the exterior circumferences of two slots are connected to each other is separated from a spiral slot region, it is easy to provide the input/output circuit at the line of the symmetry axis. Accordingly, matching between the filter and the input/output circuit is increased.

The construction of a dielectric filter according to a fifth embodiment of the present invention is described with reference to FIGS. 5A and 5B.

Figure 5A:
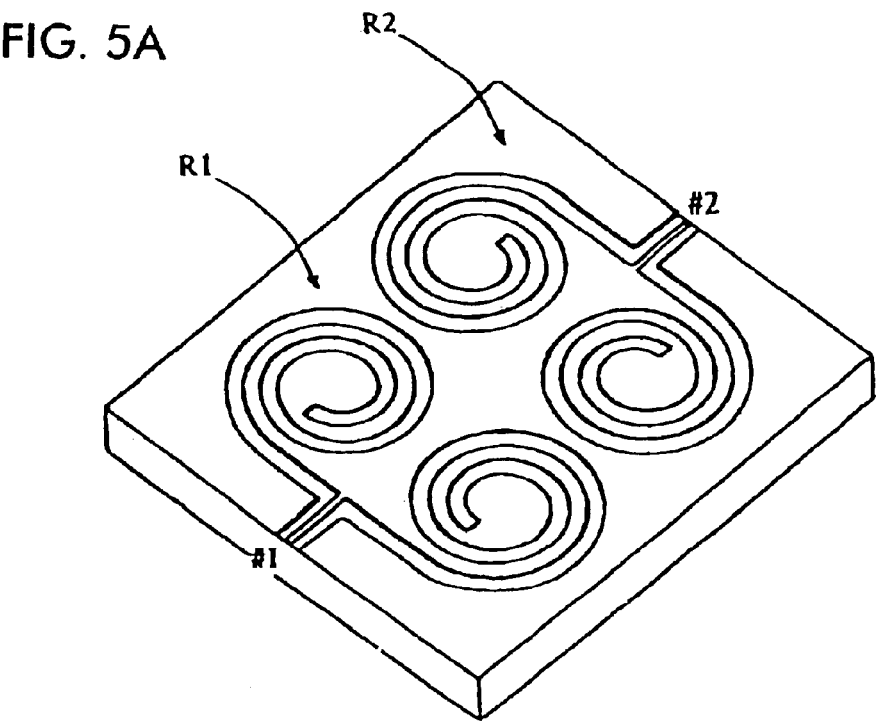
FIGS. 5A and 5B are diagrams showing constructions of dielectric filters according to a fifth embodiment of the present invention.

In FIG. 5A, resonators R1 and R2, constructed using slot lines, are individually identical to the resonator shown in FIG. 4. By locating the two slot lines close to each other, magnetic-field coupling occurs. Thus, a two-stage resonator constitutes a dielectric filter having bandpass characteristics where ports #1 and #2 using coplanar lines are employed as input/output circuits.

Figure 5B:
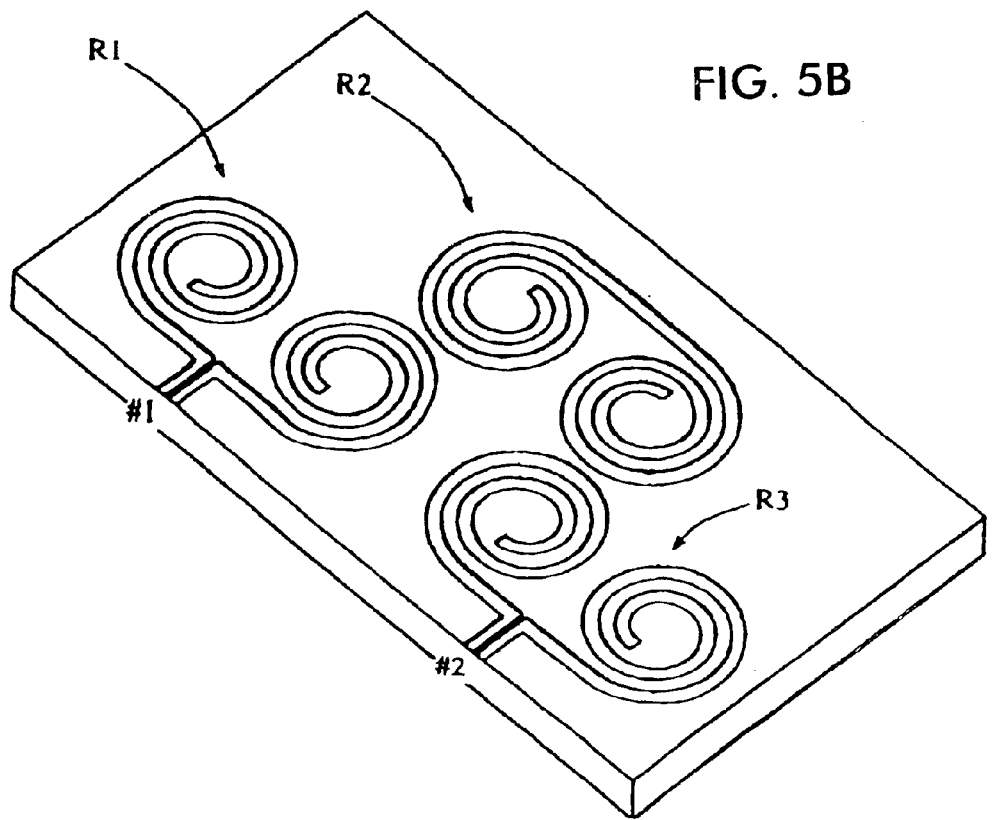

In FIG. 5B, resonators R1, R2 and R3, constructed using slot lines, are individually identical to the resonator shown in FIG. 4. By providing the three slot lines close to one another in the above mentioned order, magnetic-field coupling occurs at a region of one slot line in close proximity to another slot line. Thus, a three-stage resonator constitutes a dielectric filter having bandpass characteristics where ports #1 and #2 using coplanar lines are employed as input/output circuits.

The construction of an inductor and a capacitor according to a sixth embodiment of the present invention is described with reference to FIGS. 6A and 6B.

Figure 6A:
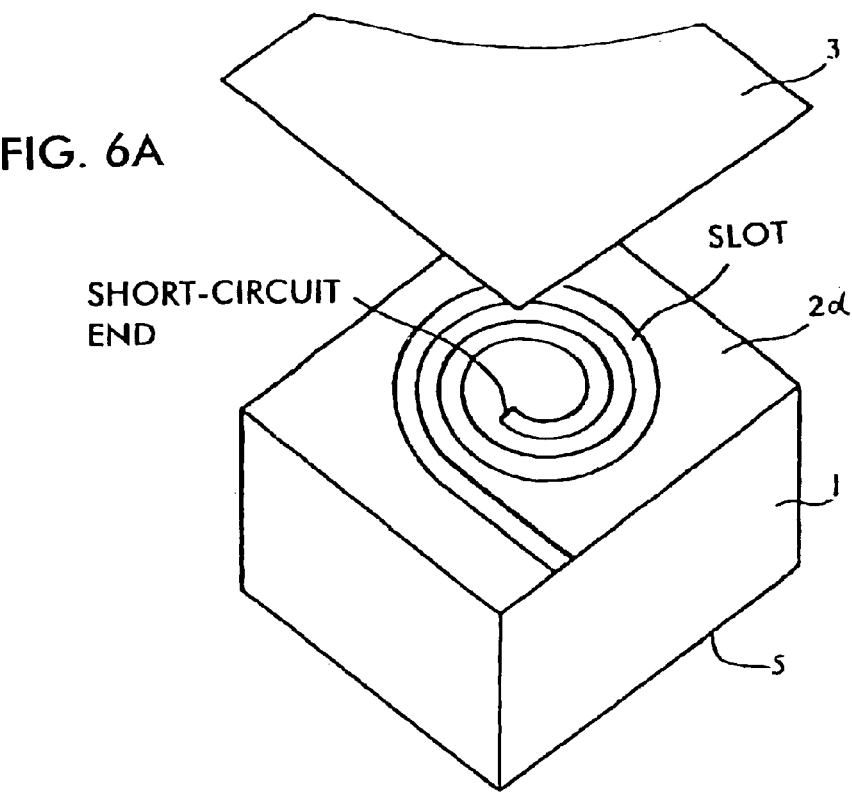
FIGS. 6A and 6B are diagrams showing constructions of an inductor and a capacitor according to a sixth embodiment of the present invention.

In FIG. 6A, a dielectric substrate 1 has a spiral slot electrode 2d at the top face thereof and an upper shielding electrode 3 at a predetermined distance above the dielectric substrate 1. When the wavelength of the slot line is $\lambda_g$, the length of the slot line is determined to be not more than $\lambda_g/8$. The interior end of the slot line is a short-circuit end.

When the time-average of the electrical energy $W_e$ of the slot line and the time-average of the magnetic energy of the slot line $W_m$ in the construction shown in FIG. 6A satisfy the relationship $W_m \gg W_e$, the slot line functions as a lumped circuit inductance element when observed from the exterior end of the slot line.

Figure 6B:
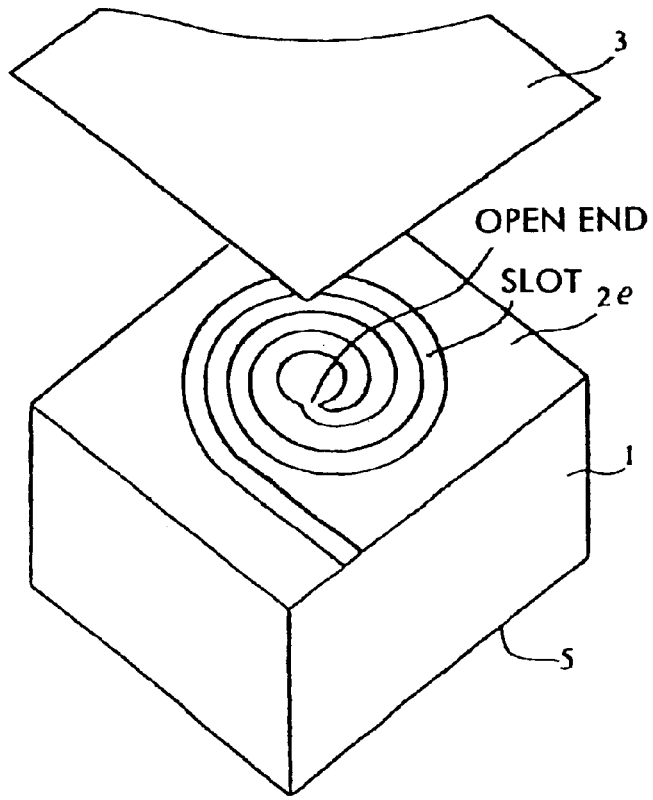

In FIG. 6B, the length of the slot line is determined to be not more than $\lambda_g/8$ and the interior end of the slot line is an open end. The rest of the construction in FIG. 6B is the same as that in FIG. 6A. In the construction in FIG. 6B, the relationship $W_m \ll W_e$ is obtained, and the slot line functions as a lumped circuit capacitance element when observed from the exterior end of the slot line.

Figure 7:
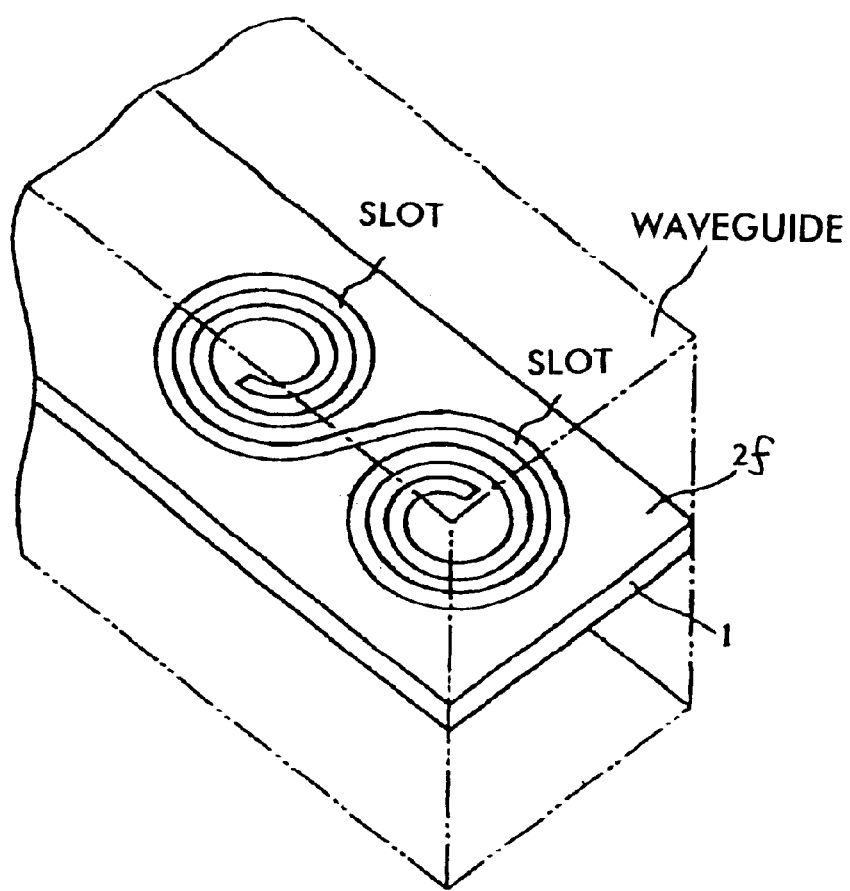
FIG. 7 is a diagram showing an example of applying the dielectric resonator to a fin line.

FIG. 7 is a partial perspective view showing the construction of a dielectric resonator according to a seventh embodiment of the present invention. In FIG. 7, the dielectric substrate 1 is disposed inside of a rectangular waveguide whereby a fin line is constructed. The dielectric substrate 1 has a slot electrode 2f at the top face thereof, as observed in the FIG. 7. The pattern of the slot electrode 2f is identical to the corresponding slot electrode shown in FIG. 3. This structure constitutes a fin line including the dielectric resonator, and also enables the dielectric resonator to function as a bandpass filter which passes a resonant frequency signal of the dielectric resonator.

Figure 8:
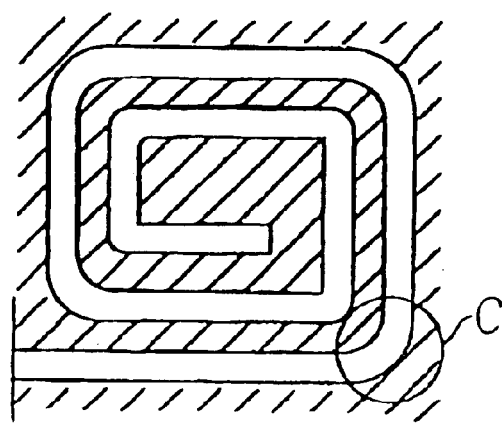
FIG. 8 is a diagram showing a pattern of a rectangular spiral slot.

In the above embodiments, a spiral slot whose curvature monotonically varies is formed in a generally circular region. Alternatively, the slot may have a rectangular spiral shape which can be formed in a generally rectangular region as shown in FIG. 8. With such a shape sufficient space for a slot line having the required length can be secured even though the amount of space is limited, which can reduce the area occupied by the spiral slot on the dielectric substrate.

FIG. 9A shows one modification of the rectangular spiral slot shown in FIG. 8; FIG. 9B shows the bend in the encircled part B of the spiral slot in FIG. 9A; and FIG. 9C shows the bend in the encircled part C in FIG. 8. When the slot width of a straight part of the slot line and that of a bent part of the slot line are the same, as shown in FIG. 8, since the interior current path $L_{in}$ of the slot and the exterior current path Lout of the slot have different physical lengths, the occurrence of a spurious mode is promoted. Accordingly, as shown in FIG. 9B, the slot width of the bent part is decreased to less than that of the straight line part so that the length difference between the interior path $L_{in}'$ of the slot and the exterior path $L_{out}'$ of the slot becomes smaller. Such a pattern can prevent the spurious mode from occurring.

FIG. 10 is a perspective view showing the construction of an oscillator. In FIG. 10, a dielectric substrate 1 has a slot electrode 2g formed on the top face thereof and a shielding electrode 5 on substantially the entire bottom face thereof. An upper shielding electrode, which is not shown in FIG. 10, is provided at a predetermined distance above the dielectric substrate 1. The slot electrode 2g has a resonator part and an oscillation circuit part. In the resonator part, two spiral slots having a line-symmetry relationship, as shown in FIG. 4, are provided, whereby the resonator using a slot line is constituted. The resonator is connected by a first coplanar line C1 to a second coplanar line C2 having at one end a terminator. Another end of the coplanar line C2 is connected to an oscillation circuit in the oscillation circuit part. In the oscillation circuit part, a coplanar line C3 connected to the line C2, or another line which is connected to the coplanar line C2 using a line-transition device, is connected to a negative-resistance circuit comprising an FET (field effect transistor) etc., as is known. By connecting the negative-resistance circuit to the resonator comprising the above slot lines, a band reflex oscillator is constructed.

The construction of another dielectric resonator having uneven slot widths is described with reference to FIGS. 11 and 12.

Figure 11:
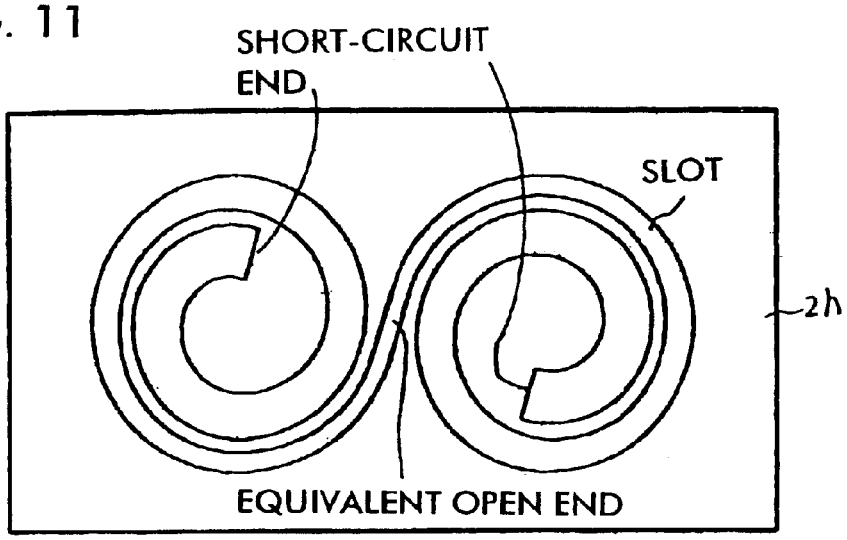
FIG. 11 is a plan view showing another construction of a dielectric resonator.

FIG. 11 is a plan view showing the dielectric resonator on a dielectric substrate. In the example shown in FIG. 3 and the like, it is assumed that the slot width of the slot line is even at any position of the longitudinal direction thereof. However, in the example shown in FIG. 11, the slot width becomes wider from each open-end toward the corresponding short-circuit end. Apart from the pattern formed on a slot electrode 2h, the other components are identical to the corresponding ones shown in FIG. 3.

When the slot width of the slot line is even from one end to the other, the current density becomes a maximum at the short-circuit end and approximately zero at the equivalent open end. Therefore, by widening the slot width of the slot line from the open end toward the short-circuit end, the current density distribution of the slot line in the longitudinal direction becomes even, which prevents the current density from increasing. As a result, the total conductor loss decreases and the unloaded Q factor further increases.

Even when the slot width is changed, by maintaining the distance between neighboring turns at a generally regular interval regardless of the position along the longitudinal direction of the slot, as shown in FIG. 11, the counterbalance action, which is caused by the currents flowing through two neighboring lines over the entire length of the slots, can be maintained.

Figure 12A:
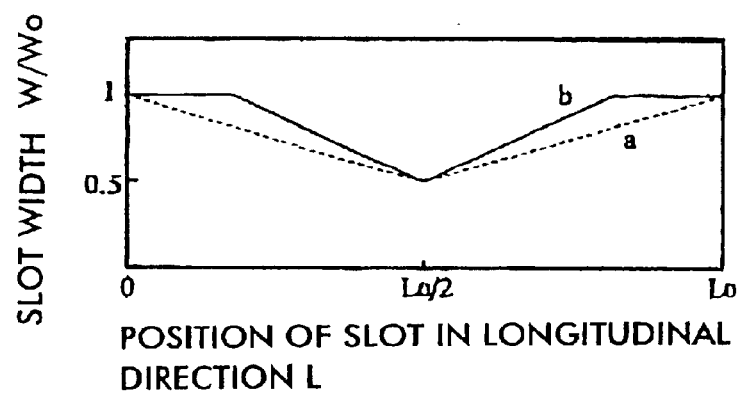
FIGS. 12A and 12B are graphs showing changes of the slot width in the dielectric resonator.
Figure 12B:
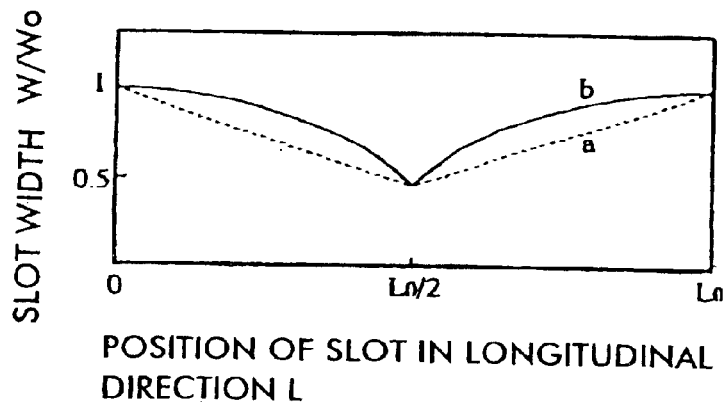

FIGS. 12A and 12B show relationships between the width of the slot line and the position along the longitudinal direction of the slot. In an example represented by broken lines "a" in FIG. 12A, when the slot width is 1 at the short circuit end and the slot width at the middle of the slot line (which is the equivalent open-end) is 0.5, the slot width is linearly changed in between. Such a linear change of the slot width facilitates the design and formation of the pattern of the slot electrode.

In an example represented by solid lines "b" in FIG. 12A, the slot width is linearly changed from the middle of the slot line up to the proximity of the short-circuit end thereof and the slot width is constant thereafter. When the slot width becomes wider towards the center of the spiral, as shown in FIG. 11, it is difficult to secure space for the slot line having the required length. However, by providing an upper limit of the slot width at around the proximity of each end of the slot line, the slot line having a predetermined length can be constructed without causing the area occupied by the slot line to increase.

In an example represented by solid lines "b" in FIG. 12B, a function of the slot width in the longitudinal direction of the slot line is a pattern which is expressed with a curve from the middle of the slot line to the short-circuit end. In this example, the function is an upward convex curve. Generally, when the current density of the slot line is observed macroscopically, the intensity is trigonometrically distributed along the longitudinal direction of the slot line so that the current density is zero at the open end and a maximum value at the short-circuit ends. On the other hand, when the slot line is in a spiral shape and the current density distribution is microscopically observed, there is a component which expands in the lateral direction. This lateral-direction component exponentially changes in the lateral direction. Accordingly, it is considered that the current density in the longitudinal direction of the slot line can be expressed with an overall function obtained by combining the trigonometric function with the exponential function. The pattern represented by "b" in FIG. 12B is obtained by considering the above current density distribution. It is difficult to express the above function using a formula. The pattern of the slot line can be obtained using a simulation or the like so that the current density distribution is made uniform and a predetermined line length is obtained in a limited space.

The pattern represented by broken lines "a" in FIG. 12B is identical to the pattern represented by "a" in FIG. 12A. As represented by "a" and "b" in FIGS. 12A and 12B, by causing the slot width vary according to a pattern which changes in accordance with the position along the longitudinal direction of the slot, since the values of currents flowing through two neighboring turns of the slot are close, an effective increase in the current counterbalance action is achieved.

Figure 13:
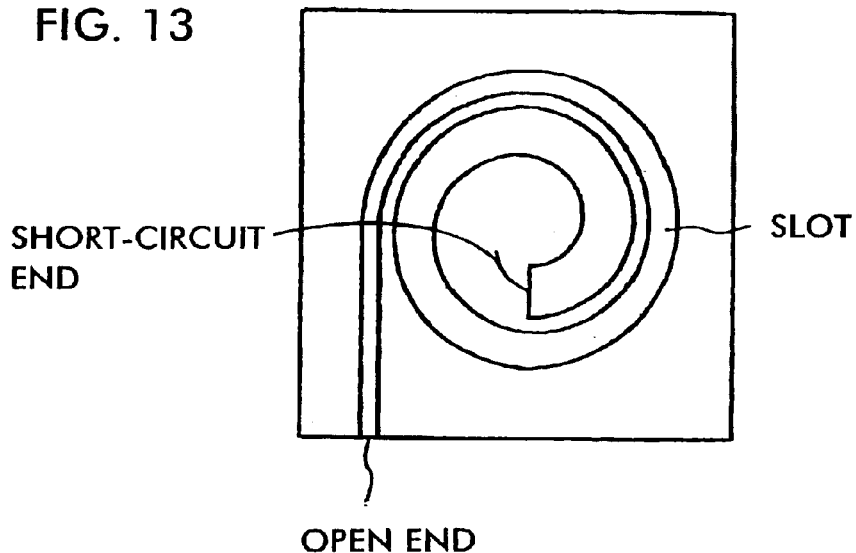
FIG. 13 is a plan view showing another construction of the dielectric resonator.

FIG. 13 is a plan view showing a dielectric substrate and a slot line which form another dielectric resonator. In examples shown in FIGS. 1A and 1B and the like, the slot width of the slot line is even at any position along the longitudinal direction thereof. In the example shown in FIG. 13, the slot width becomes wider from the open end toward the short-circuit end. Apart from the pattern formed on the slot electrode, the other components are identical to the corresponding ones shown in FIGS. 1A and 1B. Such a construction causes the conductor loss to decrease as well as the unloaded Q factor to further increase, thereby functioning as a quarter-wavelength resonator.

Figure 14:
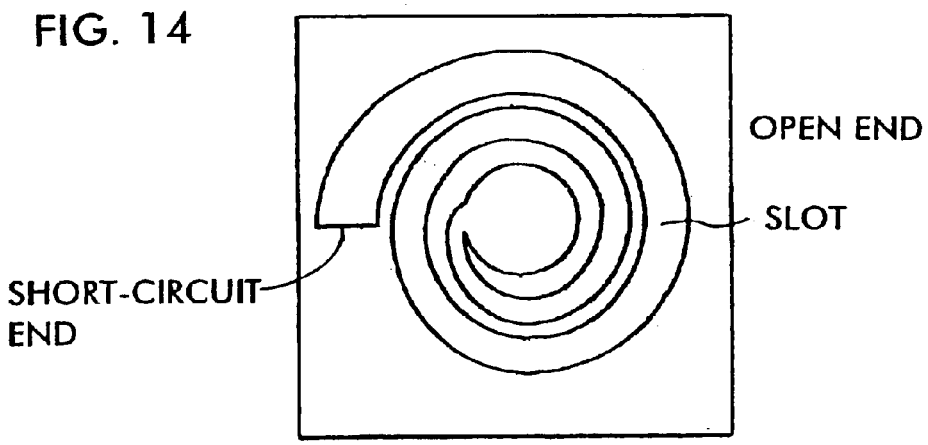
FIG. 14 is a plan view showing further another construction of the dielectric resonator.

FIG. 14 is a plan view of a dielectric substrate and slot line which form yet another dielectric resonator. In this dielectric resonator, a spiral slot line has a short-circuit end at the exterior circumferential end thereof and an open end at the interior circumferential end. In the examples shown in FIG. 2 and the like, the slot width of the slot line is even at any position of the longitudinal direction thereof. In the example shown in FIG. 14, the slot width becomes wider from the open end toward the short-circuit end. Apart from the pattern formed on the slot electrode, the other components are identical to the corresponding ones shown in FIG. 2. Such a construction also causes the unloaded Q factor to increase, thereby functioning as a quarter-wavelength resonator.

Regarding a capacitor or an inductor, in the same manner as in the case of the dielectric resonator, by making the slot width of the slot line wider from the open end toward the short-circuit end based on the construction shown in FIG. 6, an inductor and a capacitor having further reduced loss can be obtained.

Likewise, regarding a filter, in the same manner as in the case of the dielectric resonator, by making the slot width of the slot line wider from the open end toward the short-circuit end based on the construction shown in, for example, FIG. 4 or FIG. 5, a filter having further reduced insertion loss can be obtained.

Figure 15:
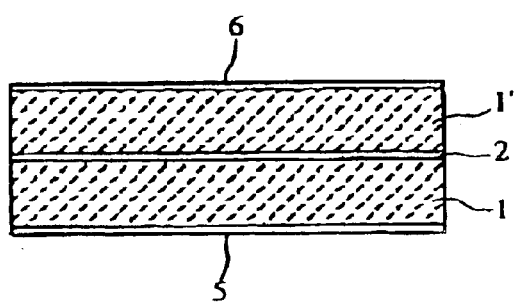
FIG. 15 is a sectional view showing still another construction of the dielectric resonator.

In each embodiment described above, the slot electrode is constructed by being provided between the dielectric layer of the dielectric substrate 1 and the dielectric layer of the outer air. However, for example, as shown in a cross sectional diagram in FIG. 15, the slot electrode may be provided so that the electromagnetic field is enclosed between the two dielectric layers and between upper and lower electrodes. That is, in FIG. 15, the construction of a dielectric substrate 1, a slot electrode 2 on the top face thereof, and a shielding electrode 5 on the bottom face thereof are identical to the corresponding components of the above-described embodiments. Furthermore, another dielectric substrate 1' is provided on the slot electrode 2 and has a shielding electrode 6 formed on the outer face thereof. In this case, the dielectric constants of the dielectric substrates 1 and 1' may be or may not be identical.

Figure 20:
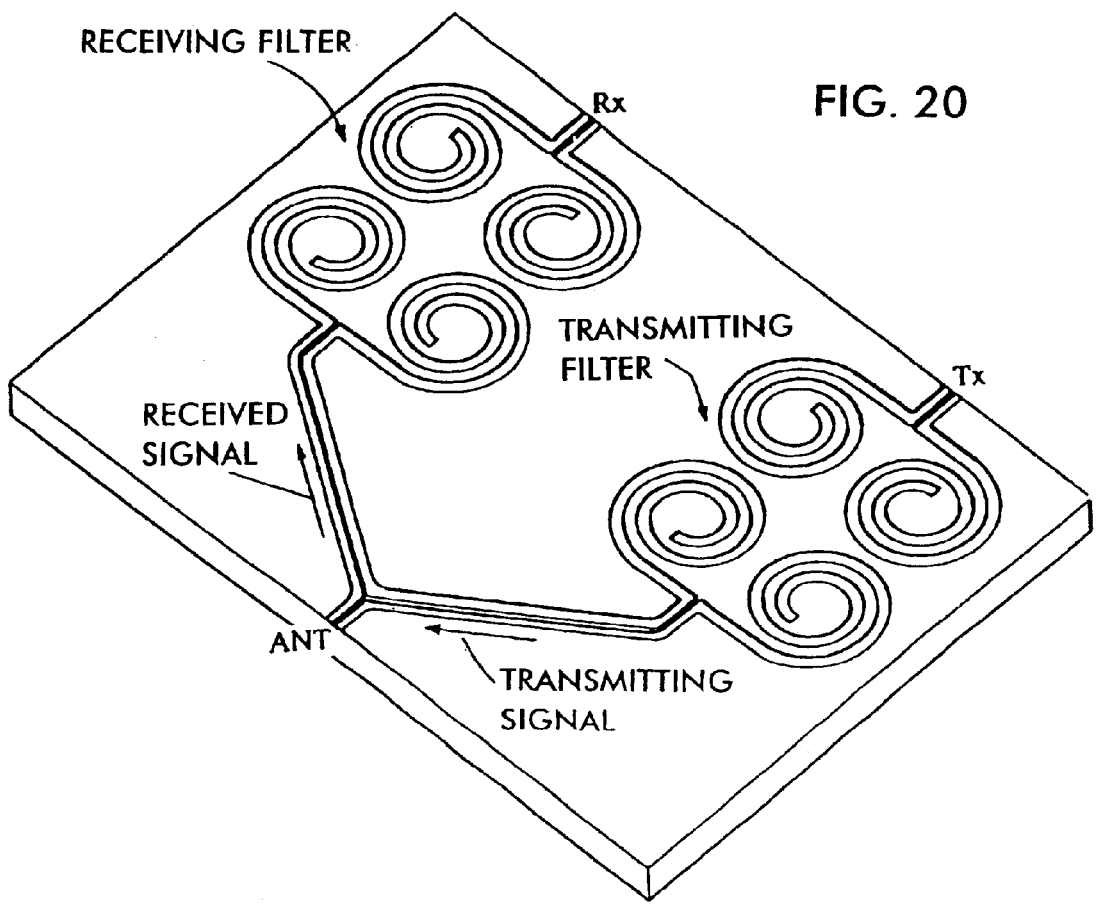
FIG. 20 is a diagram showing the construction of a dielectric duplexer according to an embodiment of the present invention.

FIG. 20 shows one example of a duplexer according to the present invention. Two filters like the filter shown in FIG. 5A are used as a transmitting filter and a receiving filter. The signs Tx, Rx, ANT denote a transmitting signal input port, a received signal output port and an input/output port respectively.

Figure 16:
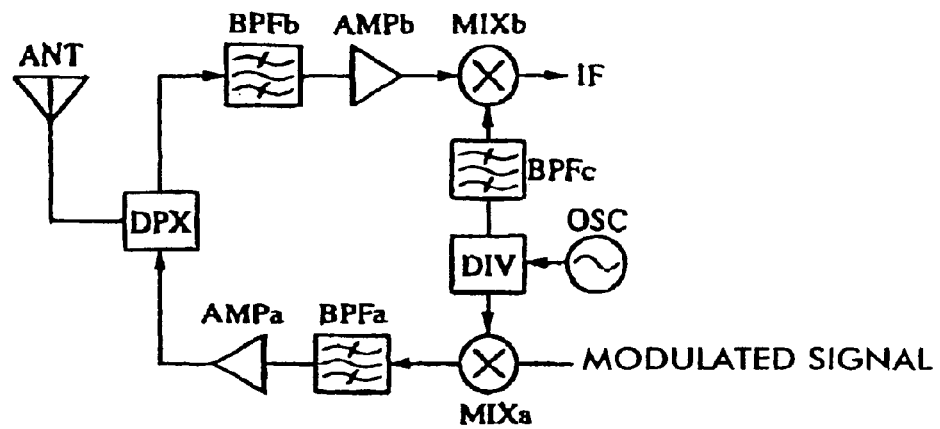
FIG. 16 is a block diagram showing the construction of a communication device.
Figure 17:
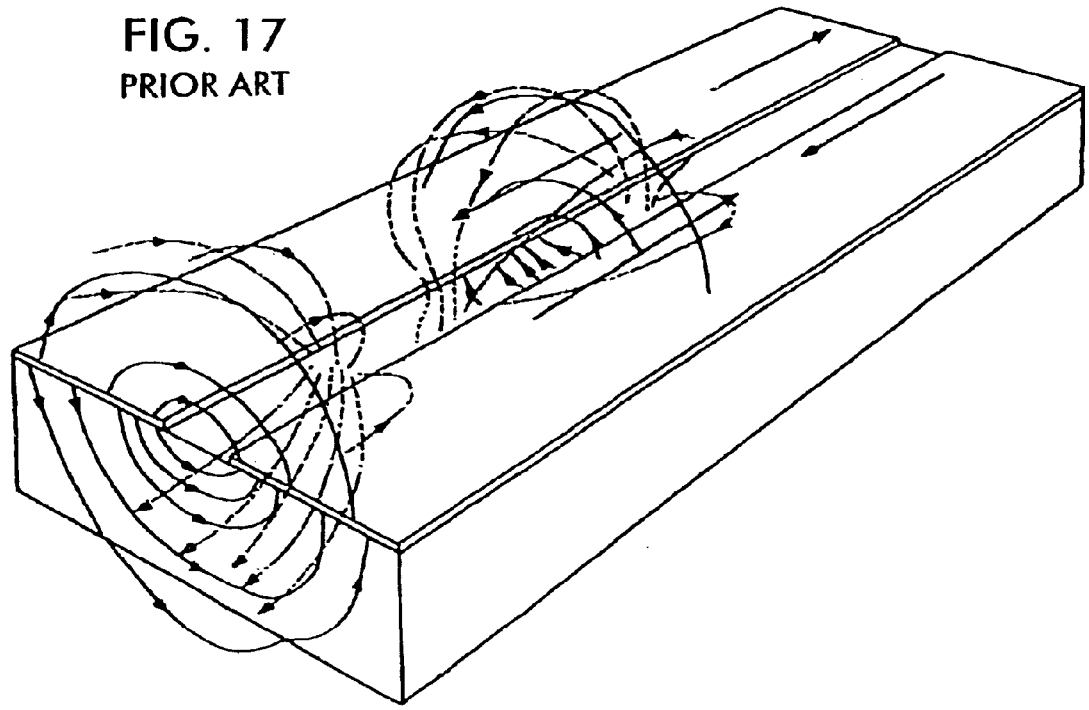
FIG. 17 is a diagram showing an example of an electromagnetic field distribution in a conventional straight slot line.

FIG. 16 is a block diagram showing the construction of a communication device using one or more of the above dielectric filters and oscillator. A mixer MIXa modulates a frequency signal, which is obtained by causing a frequency divider (synthesizer) DIV to divide an oscillating frequency generated at an oscillator OSC, with a modulating signal. A signal of transmission frequencies among the modulated signal is allowed to pass by a band pass filter BPFa and is power-amplified by an amplifier AMPa, and the amplified signal is transmitted via a duplexer DPX from an antenna ANT toward the outside. A band pass filter BPFb allows a signal of received frequencies of an input signal from the duplexer DPX to pass, and an amplifier AMPb amplifies the received signal. A mixer MIXb mixes a frequency signal from a band pass filter BPFc with the received signal into an intermediate frequency signal IF.

The dielectric duplexer having the construction in FIG. 20 may be used as the duplexer DPX. The dielectric filters having the constructions in FIGS. 5A and 5B may be used as the band pass filters BPFa, BPFb, and BPFc shown in FIG. 16, and the oscillator having the construction shown in FIG. 10 may be used as the oscillator OSC. These dielectric filters and oscillator may be surface-mounted on a circuit substrate of a high frequency circuit unit. Thus, a compact communication device can be constructed.

Regarding the above inductor and capacitor, in the same manner as in the dielectric filters and oscillator, inductors and capacitors in a communication device may be surface-mounted on a circuit substrate of the high frequency circuit unit.

Although embodiments of the invention have been described herein, the invention is not limited to those embodiments, but includes all modifications, variations and equivalents that would occur to those having the ordinary level of skill in the art.

What is claimed is:

1. An oscillator for a predetermined frequency, comprising:
   a negative resistance circuit; and
   a dielectric resonator coupled to said negative resistance circuit, said dielectric resonator including:
      a slot line comprising a slot electrode having a spiral slot disposed adjacent to a dielectric layer; and
      a shielding conductor provided at a predetermined distance from said slot electrode;
   wherein said slot line is resonant at said predetermined frequency.

2. A communication device comprising:
   an oscillator according to claim 1;
   said oscillator being comprised in a high-frequency circuit selected from the group consisting of a transmitter and a receiver.

3. A communication device for a predetermined frequency, comprising
   a high-frequency circuit, said high-frequency circuit including at least one of an inductor and a capacitor having
      a slot line comprising a slot electrode having a spiral slot disposed adjacent to a dielectric layer; and
      a shielding conductor provided at a predetermined distance from said slot electrode; wherein:
      an end of said slot line is a short-circuit end; and
      the length of the slot is not more than one-eighth of a transmission wavelength of said slot line at said predetermined frequency.

* * * * *